(12) United States Patent
Schirtzinger

(10) Patent No.: US 8,402,744 B2
(45) Date of Patent: Mar. 26, 2013

(54) VALVE SYSTEM FOR A GAS TURBINE ENGINE

(75) Inventor: Gary A. Schirtzinger, Glastonbury, CT (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1327 days.

(21) Appl. No.: 12/053,591

(22) Filed: Mar. 22, 2008

(65) Prior Publication Data
US 2009/0235642 A1    Sep. 24, 2009

(51) Int. Cl.
*F02K 1/00* (2006.01)
*B63H 25/46* (2006.01)

(52) U.S. Cl. .............. 60/231; 239/265.17; 60/772

(58) Field of Classification Search .............. 60/39.23, 60/226.1, 226.3, 231, 262, 267; 239/123.3, 239/127.1, 265.17, 265.19
See application file for complete search history.

(56) References Cited

U.S. PATENT DOCUMENTS

| | | | |
|---|---|---|---|
| 4,570,668 A | 2/1986 | Burke et al. | |
| 4,674,951 A | 6/1987 | Jourdain et al. | |
| 4,679,982 A | 7/1987 | Bouiller et al. | |
| 4,711,084 A | 12/1987 | Brockett | |
| 4,854,127 A | 8/1989 | Vinson et al. | |
| 4,926,633 A * | 5/1990 | Nash et al. | 60/226.1 |
| 5,012,639 A | 5/1991 | Ream et al. | |
| 5,123,240 A | 6/1992 | Frost et al. | |
| 5,127,222 A | 7/1992 | Ream et al. | |
| 5,211,007 A | 5/1993 | Marvin | |
| 5,307,624 A | 5/1994 | Even-Nur et al. | |
| 5,309,710 A * | 5/1994 | Corr, II | 60/39.23 |
| 5,867,980 A | 2/1999 | Bartos | |
| 6,301,877 B1 | 10/2001 | Liang et al. | |
| 6,385,959 B1 | 5/2002 | Montoya | |
| 6,471,475 B1 | 10/2002 | Sasu et al. | |
| 6,588,195 B2 * | 7/2003 | Negulescu | 60/785 |
| 6,622,475 B2 | 9/2003 | Brault et al. | |
| 6,679,048 B1 | 1/2004 | Lee et al. | |
| 6,694,723 B2 | 2/2004 | Ward | |
| 6,701,715 B2 | 3/2004 | Anderson et al. | |
| 6,802,691 B2 | 10/2004 | Chlus | |
| 6,877,306 B2 | 4/2005 | Wernberg et al. | |
| 6,895,756 B2 | 5/2005 | Schmotolocha et al. | |
| 6,907,724 B2 | 6/2005 | Edelman et al. | |
| 6,997,676 B2 | 2/2006 | Koshoffer | |
| 7,028,484 B2 | 4/2006 | Prociw et al. | |
| 7,032,835 B2 | 4/2006 | Murphy et al. | |
| 7,055,303 B2 | 6/2006 | Macfarlane et al. | |
| 7,093,442 B2 | 8/2006 | Lovett | |
| 7,114,519 B2 | 10/2006 | Aitchison et al. | |
| 7,174,704 B2 | 2/2007 | Renggli | |
| 7,189,055 B2 | 3/2007 | Marini et al. | |
| 7,225,623 B2 | 6/2007 | Koshoffer | |
| 7,244,104 B2 | 7/2007 | Girgis et al. | |
| 7,500,347 B2 * | 3/2009 | Sanders et al. | 60/39.23 |
| 2003/0126853 A1 | 7/2003 | Koshoffer et al. | |
| 2003/0217552 A1 | 11/2003 | Calabro | |
| 2004/0006969 A1 | 1/2004 | Whurr | |
| 2004/0187474 A1 | 9/2004 | Martens et al. | |
| 2004/0216444 A1 | 11/2004 | Lovett | |
| 2005/0081509 A1 | 4/2005 | Johnson | |
| 2005/0091982 A1 | 5/2005 | Renggli et al. | |
| 2005/0172611 A1 | 8/2005 | James Blodgett et al. | |

* cited by examiner

*Primary Examiner* — Ehud Gartenberg
*Assistant Examiner* — Arun Goyal
(74) *Attorney, Agent, or Firm* — Carlson, Gaskey & Olds

(57) ABSTRACT

A valve system intermediate a secondary flow path and a primary flow path to selectively communicate secondary airflow into the primary gas flow path and control airflow injected from a higher pressure plenum into a lower pressure flowpath.

22 Claims, 3 Drawing Sheets

VALVE SYSTEM FOR A GAS TURBINE ENGINE

BACKGROUND OF THE INVENTION

The present invention relates to a gas turbine engine, and more particularly to a valve system for operation therewith.

A gas turbine engine, such as a turbofan engine for an aircraft, includes a fan section, a compression section, a combustion section, and a turbine section. An axis of the engine is centrally disposed within the engine, and extends longitudinally through these sections. A primary flow path extends axially through the engine. An annular secondary flow path is generally located radially outward of the primary flow path.

Cooling air along the secondary flow path is often communicated to the primary flow path during particular operating conditions. In order to assure efficient engine operation and performance, communication of the cooling air from the secondary flow path to the primary flow path needs to be meticulously rationed.

SUMMARY OF THE INVENTION

A valve system according to an exemplary aspect of the present invention is located intermediate a secondary flow path and a primary exhaust flow path. The valve system selectively communicates secondary airflow to control airflow from a higher pressure plenum into a lower pressure flowpath. The valve system generally includes a multiple of poppet valves which are each movably mounted relative to a valve seat for movement between a closed position and an open position. The valve seat may be mounted to, or form a portion of, a plenum wall such as an inner cooling liner structure of a gas turbine engine to provide for communication between the secondary flow path and the primary flow path. An actuator system having a mechanical, hydraulic, pneumatic or electromagnetic actuator controls movement of the multiple of poppet valves.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
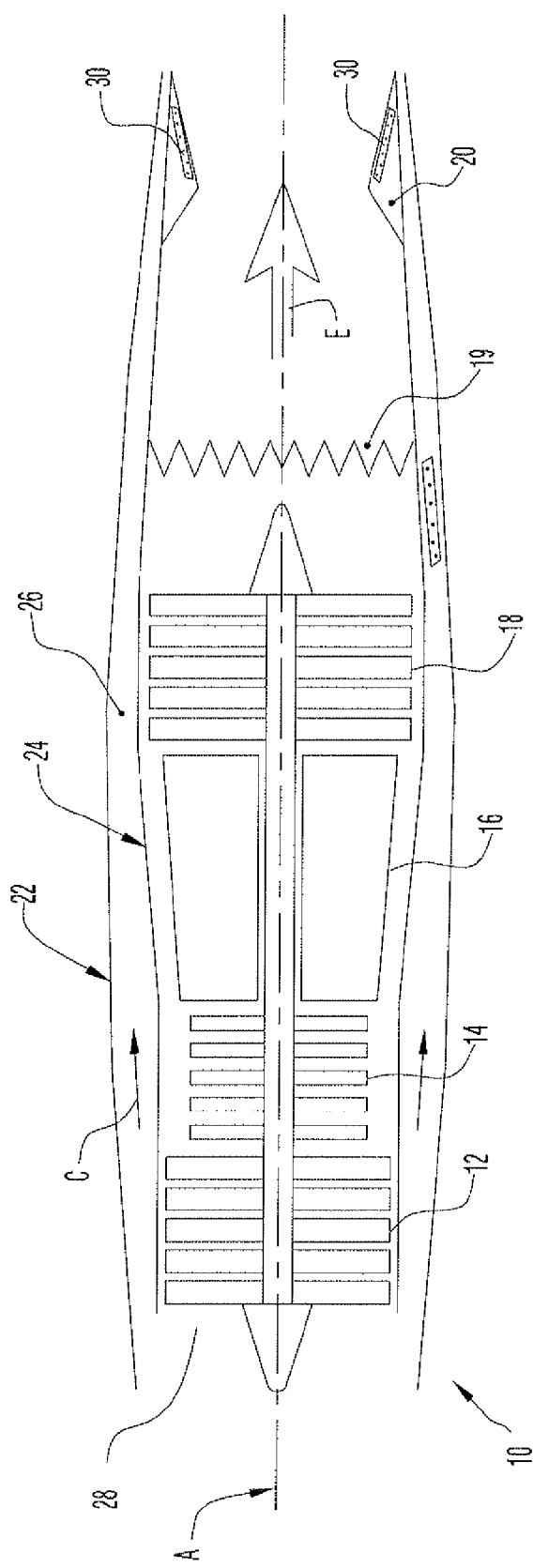
FIG. 1 is a general sectional view an exemplary gas turbine engine embodiment for use with the present invention.

FIG. 1 schematically illustrates a gas turbine engine 10 which generally includes a fan section 12, a compressor section 14, a combustor section 16, a turbine section 18, an augmentor section 19, and a nozzle section 20. The compressor section 14, combustor section 16, and turbine section 18 are generally referred to as the core engine. An axis of the engine A is centrally disposed and extends longitudinally through these sections.

An engine duct structure 22 and an inner cooling liner structure 24 define an annular secondary flow path 26 at least partially around a perimeter of a primary flow path 28 which directs a primary combustion core gas exhaust flow (illustrated schematically by arrow E). It should be understood that the engine duct structure 22 may also at least partially define various airflow paths other than the disclosed secondary flow path 26.

The secondary flow path 26 guides a secondary airflow C between the engine duct structure 22 and the inner cooling liner structure 24. The secondary airflow as defined herein may be any airflow different from the primary combustion core gas exhaust flow E such as an advent cycle third stream fan flow which may be sourced from the fan section 12 and/or compressor section 14. The secondary airflow C is utilized for a multiple of purposes including, for example, cooling, pressurization, partial shielding and mixing with the core gas flow E in the nozzle section 20 during particular operational profiles.

A valve system 30 is located intermediate the secondary flow path 26 and the primary flow path 28 to selectively communicate secondary airflow C into the primary gas flow path E. For example only, under certain conditions, such as when an aircraft is hovering, less secondary airflow may be required in the nozzle section 20. By blocking the secondary airflow thereto, additional secondary airflow then becomes available for other purposes. It should be understood that the valve system 30 may be utilized in any location and any environment to control airflow injected from a higher pressure plenum into a lower pressure flowpath such as, for example only, in a nozzle section of a gas turbine engine. The valve system 30 operates rapidly and repeatedly while configured to be received within minimal package space.

Figure 2:
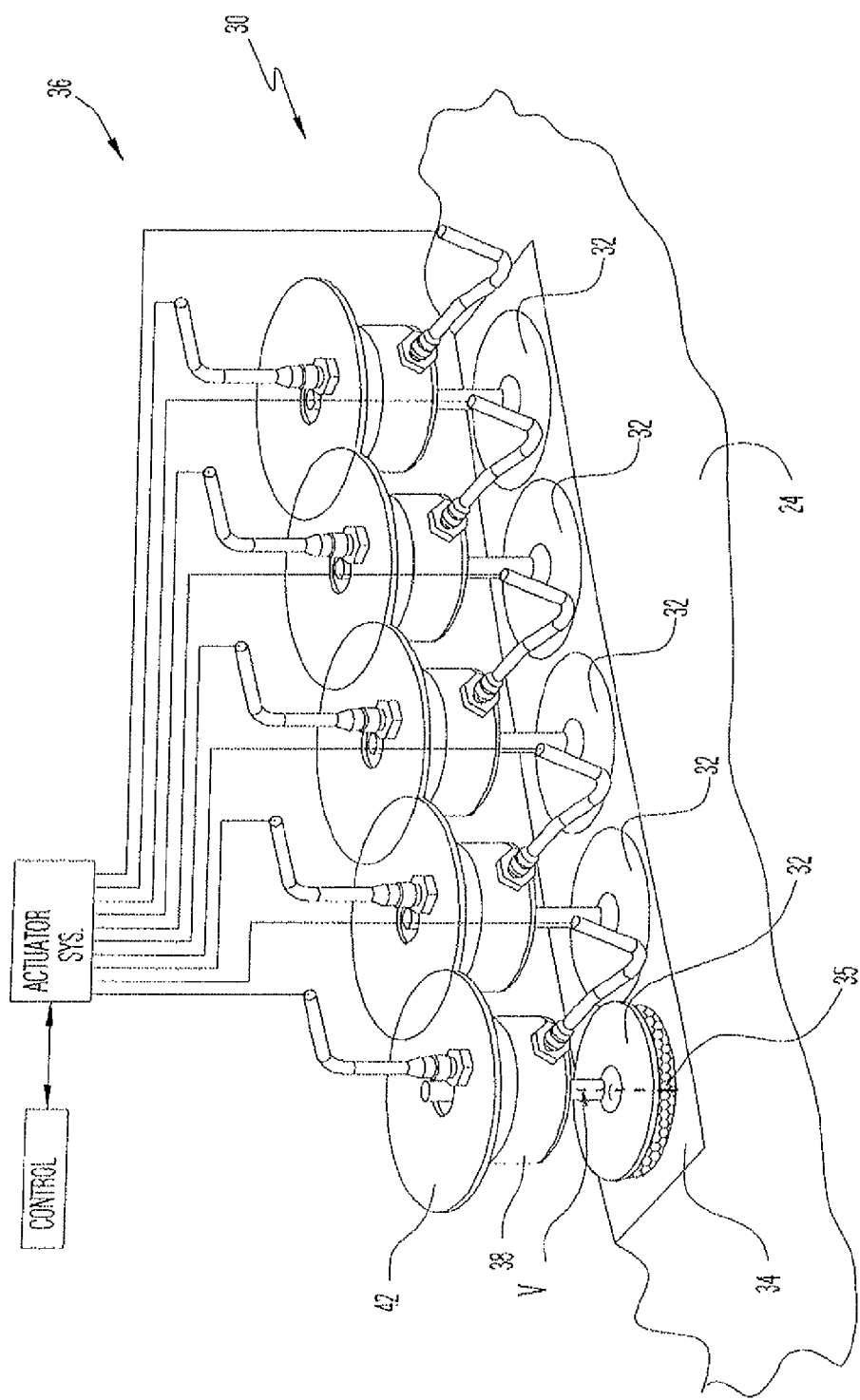
FIG. 2 is an expanded view of a valve system for use with a gas turbine engine.

Referring to FIG. 2, the valve system 30 generally includes a multiple of poppet valves 32 which are each movably mounted to a valve seat 34 for movement between a closed position and an open position along a respective valve axis V. The multiple of poppet valves 32 although illustrated as generally round in the disclosed embodiment may be of any shape or configuration. Furthermore, each of the multiple of poppet valves 32 need not be of the same shape or size.

The valve seat 34 may be mounted to, or form a portion of, a plenum wall such as the inner cooling liner structure 24 (also illustrated in FIG. 1) to provide for communication between the secondary flow path 26 and the primary flow path 28. The valve seat 34 at least partially surrounds an airflow path 35 which directs the airflow between the secondary flow path 26 and the primary flow path 28. The airflow path 35 may include a mesh, grid, metering hole, honeycomb structure, or such like which directs and smoothes the airflow therethrough as well as reduces noise generation.

An actuator system 36 drives a mechanical, hydraulic, pneumatic or electromagnetic actuator 38 which drives movement of each of the multiple of poppet valves 32 in response to a control. The actuator system 36 may include a seal structure 42 which may be located at the engine duct structure 22 such that at least a portion of the actuator system 36 may be located external to the engine duct structure 22. It should be understood that various actuator systems may be usable with the present invention.

Figure 3:
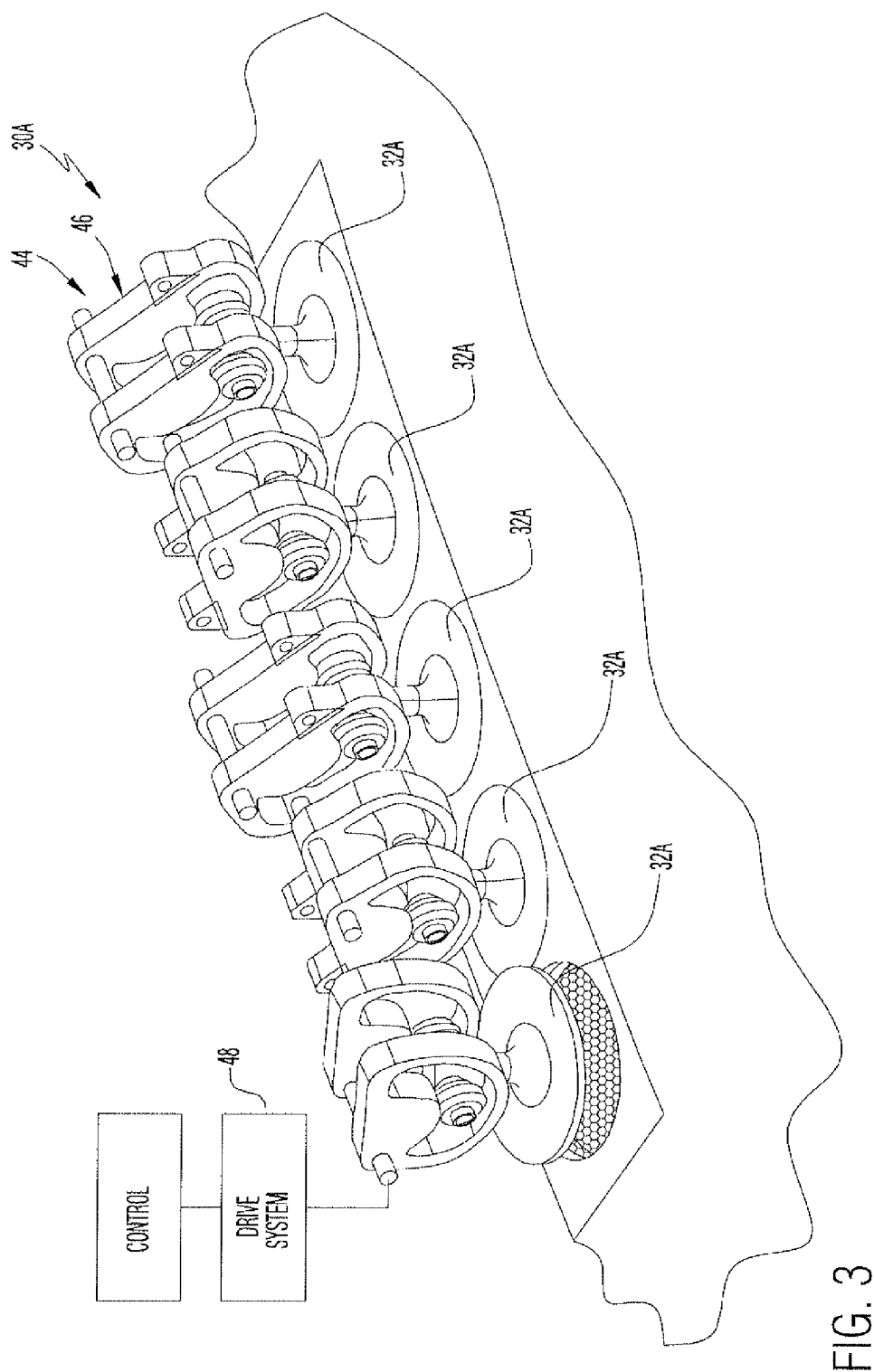
FIG. 3 is an expanded view of another valve system for use with the gas turbine engine.

Referring to FIG. 3, another embodiment of the valve system 30A includes a multiple of poppet valves 32A movable between a closed position and a multiple of open positions through an actuator system 44. The actuator system 44 in the disclosed embodiment includes a cam structure 46 which opens each of the multiple of poppet valves 32 in response to a drive system 48. The cam structure 46 may be arranged to open the multiple of poppet valves 32 in a sequence which communicates a predetermined volume of airflow relative to the predetermined sequence. It should be understood that essentially infinite sequences may be provided. Alternatively, each of the multiple of poppet valves 32 may be individually operated through independent cam linkages or other such linkages.

Each of the multiple of poppet valves may be of equivalent or different size to control airflow therethrough. It should be understood that other opening sequences and drive arrangements may alternatively or additionally be provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve system intermediate a secondary flow path and a primary flow path of a gas turbine engine comprising:
    a valve seat defining a flow passage there through between a secondary flow path and a primary flow path; and
    a plurality of poppet valves movable relative said valve seat between an open position and a closed position with regard to said flow passage, said flow passage including a structure that directs flow through said flow passage;
    wherein said plurality of poppet valves, and said valve seat define a corresponding plurality of flow passages between the secondary flow path and the primary flow path; and
    an actuator system that is operable to selectively move said plurality of poppet valves; and
    a controller in communication with said actuator system and operable to command said actuator system to move said plurality of poppet valves wherein said controller is operable to command said actuator system to move said plurality of poppet valves sequentially.

2. The system as recited in claim 1, wherein said plurality of poppet valves are movable along a valve axis relative to said valve seat to define an open position and a closed position.

3. The system as recited in claim 1, wherein said valve seat is mounted to an inner cooling liner structure of a gas turbine engine.

4. The system as recited in claim 1, wherein said valve seat is formed into an inner cooling liner structure of a gas turbine engine.

5. The system as recited in claim 1, further comprising an actuator system which independently operates each of said plurality of poppet valves.

6. The system as recited in claim 1, wherein said structure is selected from the group consisting of a mesh, a grid, a metering hole and a honeycomb.

7. The system as recited in claim 1, wherein said structure includes a mesh.

8. The system as recited in claim 1, wherein said structure includes a grid.

9. The system as recited in claim 1, wherein said structure includes a honeycomb.

10. The system as recited in claim 1, wherein said structure includes a metering hole.

11. A gas turbine engine comprising:
    an engine duct structure and an inner cooling liner structure which at least partially define a secondary flow path and a primary flow path along a longitudinal axis;
    a valve seat mounted to said inner cooling liner structure; and
    a plurality of poppet valves movable relative said valve seat between an open position away from the longitudinal axis and a closed position toward the engine axis;
    said plurality of poppet valves, and said valve seat define a corresponding plurality of flow passages between the secondary flow path and the primary flow path; and
    an actuator system that is operable to selectively move said plurality of poppet valves; and
    a controller in communication with said actuator system and operable to command said actuator system to move said plurality of poppet valves wherein said controller is operable to command said actuator system to move said plurality of poppet valves sequentially.

12. The engine as recited in claim 11, wherein said valve seat is flush with said inner cooling liner structure.

13. The system as recited in claim 11, wherein said actuator system operates said plurality of poppet valves and said actuator system including a linkage which extends through said engine duct structure.

14. The engine as recited in claim 11, wherein said secondary flow path is defined radially about said primary flow path.

15. The system as recited in claim 11, wherein said controller is operable to command said actuator system to move said plurality of poppet valves individually.

16. The system as recited in claim 11, wherein said plurality of flow passages include a plurality of corresponding structures that direct flow through the plurality of flow passages.

17. A method of a controlling communication of a secondary flow path with a primary flow path of a gas turbine engine comprising the steps of:
    selectively moving plurality of poppet valves relative a valve seat mounted intermediate the secondary flow path and the primary flow path between an open position and a closed position;
    wherein said plurality of poppet valves, and said valve seat define a corresponding plurality of flow passages between the secondary flow path and the primary flow path;
    providing an actuator system that is operable to selectively move said plurality of poppet valves; and
    providing a controller in communication with said actuator system and operable to command said actuator system to move said plurality of poppet valves wherein said controller is operable to command said actuator system to move said plurality of poppet valves sequentially.

18. A method as recited in claim 17, further comprising:
    opening said plurality of poppet valves outwardly relative the primary flow path.

19. A method as recited in claim 17, further comprising: opening said plurality of poppet valves individually.

20. A method as recited in claim 17, further comprising: sourcing the primary airflow to the primary flow path from a primary combustion core gas exhaust flow of the gas turbine engine.

21. A method as recited in claim 20, further comprising: sourcing the secondary airflow to the secondary flow path from a source different than the primary combustion core gas exhaust flow of the gas turbine engine.

22. A method as recited in claim 21, further comprising: sourcing the secondary airflow to the secondary flow path from an advent cycle third stream fan flow which from a fan section of the gas turbine engine.

* * * * *